Aug. 17, 1926.  1,596,096

N. U. GREENLAW

SMOKE HOOD FOR COOK STOVES

Filed March 10, 1926

Inventor.

Norman U. Greenlaw

Patented Aug. 17, 1926.

1,596,096

UNITED STATES PATENT OFFICE.

NORMAN U. GREENLAW, OF NORWAY, MAINE.

SMOKE HOOD FOR COOKSTOVES.

Application filed March 10, 1926. Serial No. 93,635.

This invention relates to cooking appliances and more especially concerns a portable covering or hood designed to substantially inclose the space around a cooking utensil in which food is being cooked on the top of a stove.

In general, the object of my invention is to provide means whereby smoke, steam or odors, either or all of them, incident to the cooking of the food, may be conducted from the cooking chamber of the hood outwardly thereof and into the combustion space in the stove, from whence it may subsequently be drawn into and pass up the flue of the chimney.

While steam generated from the water in which meats or vegetables are being cooked in ordinary pots or kettles is disagreeable if allowed to escape into the room, it is in the preparation of food requiring to be cooked with butter, lard or oil in open-top or loosely covered vessels that the efficacy of my device is best demonstrated. The smoke and particularly the odor arising from heating these fats is extremely obnoxious when disseminated throughout the house.

It is a specific object of my invention to provide means to control the force of the draft of air passing into and out of the hood. I attain my object by placing a partition immediately at the rear of the food-cooking vessel and carry it upwardly to within a relatively short distance from the top of the cooking chamber. I mount on the interior of the top wall of the hood, or on the partition, preferably the latter, a damper, by which the effective opening between the two chambers of the hood may be varied as desired. By the actuation of this damper a draft of greater or lesser potency may be had.

Another object of this partition and damper is to either wholly confine the heat within, or delay its exit from the chamber in the hood where the food is being cooked. By adjusting the damper so that all smoke and steam may escape but without unnecessarily drafting the heated air from the cooking chamber, a much higher temperature may be maintained in the latter and this obviously tends to accelerate the cooking of the food.

A still further object relates to the curved form of the top wall of the smoke-hood adjacent the front end. This design of construction prevents the smoke swerving around the edge of the hood top and escaping through the front opening into the room, as it would do should the top be made flat or sloping toward the rear. This shape, moreover, has distinct directional characteristics in that it turns the smoke or steam rising from the front portion of the cooking utensil, rearwardly, and materially assists in their expulsion from the chamber.

And an additional object pertains to the door at the front end of the smoke-hood, which when closed and in conjunction with the damper, which also may be closed, converts the smoke-hood into a very convenient although improvised oven.

With these and other objects in view the invention consists in certain novel features hereinafter shown and described and more specifically pointed out in the appended claims; and in the drawings in which one and the preferred embodiment of my invention is illustrated,—

Like characters of reference indicate similar parts throughout all the different views in the drawing.

Figure 1:
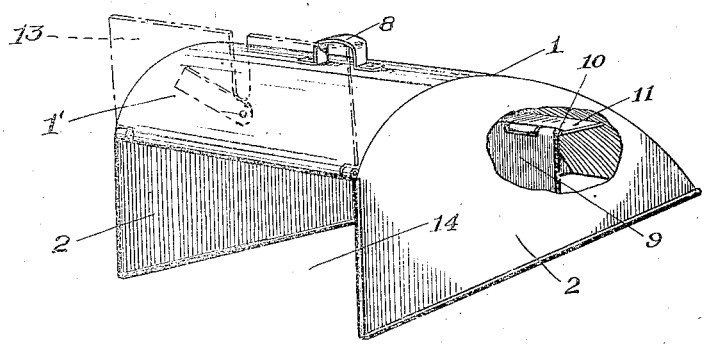
Fig. 1 is a perspective of the smoke-hood with the front door removed.

Referring to the drawing, 1 represents the top wall of the smoke-hood and in form or contour I preferably make it to closely resemble an involute curve with the starting point in the generation of the involute line located at the forward end of the smoke-hood. The top wall descends to the base line of the smoke-hood at the rearward end of the latter.

Joined to the top wall are the side walls 2, 2, preferably converging toward the rear of the smoke-hood and the whole structure is made sufficiently long to embrace space over both the front and rear stove holes 3 and 4, respectively, of the stove top 5, these holes communicating with the combustion chamber 6 of the stove and with the stove pipe 7, which latter continues on to the flue in the chimney (not shown).

A handle 8, by which the smoke-hood may be conveniently manipulated on and off the stove top, is secured to the top wall of the smoke-hood, or any other convenient location thereon.

Dividing the interior space of the smoke-hood into two compartments is a partition 9 extending from the base line of the smoke-hood to a point a relatively short distance from the top wall.

Figure 2:
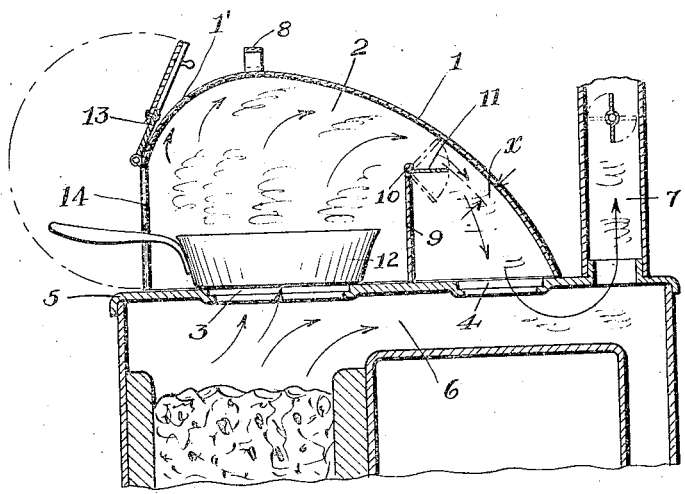
Fig. 2 is a sectional elevation of the smoke-hood mounted on a stove top with a cooking vessel in place, the section being taken on a central longitudinal line through the smoke-hood.

On the upper edge of this partition, at 10, I hinge a damper 11, by the actuation of which various sizes of effective openings in the passage between the two compartments of the smoke-hood may be had (one size being shown at $x$, Fig. 2). The damper may be turned so as to provide an opening the full area of the passage (the space between the partition and the top wall), or it may be made to completely close the latter.

By varying the size of this opening, $x$, from one compartment to the other, drafts of various force may be obtained. Illustrations of this principle, somewhat analogous in application, might be cited in the case of the smoker placing his fingers over the opening in the bowl of his pipe, restricting its size. A draft through the pipe stem will greatly accelerate combustion of the tobacco; similarly with a water-hose—by reducing the size of the aperture, as by a nozzle, the force of the stream will be greatly amplified.

In some types of smoke-hoods the steam and smoke are conducted to and discharged through the stove-hole over which the cooking vessel is placed. This greatly impedes the cooking operation due to the cooling effect of the air draft downwardly against the heat rising to the cooking vessel.

It will be noted that in my smoke-hood this discharge is through the rear stove-hole and that the relatively high partition shields the cooking vessel from the cooling influence of the air drafted outwardly through the draft chamber.

Figure 5:
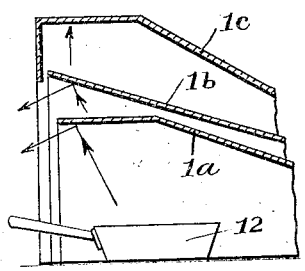
Fig. 5 illustrates vertical sections through three conventional type smoke-hoods and is shown for the purpose of comparison with the present invention.

In Fig. 5 I illustrate, for the purpose of comparison with my own, several conventional types of smoke-hoods. In my first attempts in constructing smoke-hoods I followed quite closely the general design of these just referred to but soon found that they all were deficient in one particular,— namely, a considerable quantity of smoke and steam arising from the skillet near the front opening would pass therethrough, this trouble being quite pronounced with the ones made similar to the illustrations, $1^a$ and $1^b$. The difficulty met with in the $1^c$ design was that smoke would eddy and cling to the space within the square upper corner of the hood and retard the progress of the same outwardly from the chamber. The arrows point in the direction which the gas will naturally take when rising from the cooking vessel and by reason of the fact that the pulling effect of the draft is somewhat more sluggish at or near the front opening than at the damper passage, the possibility is always present that more or less of the smoke or steam will find an exit through the front of the smoke-hood.

In contrast with the top wall of the just previously described types, the same element in my smoke-hood, shown in Fig. 2, functions to catch the gases rising in the forward end of the cooking chamber and by its curved contour against which the gases obliquely strike will deflect them rearwardly in an even, uninterrupted flow, until picked up and carried forward by the more rapidly moving current though the damper passage.

In the preparation of certain food the smoke and odor will quickly pass off after the preliminary heating and thereafter or until the cooking operation is completed, there will be no further annoyance from this source. It is advantageous to retain, so far as possible, the heat within the cooking chamber so as to expedite the cooking of the food. So when this stage in the cooking process has been reached, the damper may be very nearly closed, the door 13 lowered, closing the front opening 14, and the smoke-hood for all intents and purposes has been converted into an oven, the damper serving as an excellent heat controlling agent.

In most cases my smoke-hood is designed to be used simply as an agent to eliminate the gas and odor nuisance, and when employed as such the front door 13 may be dispensed with, as shown in Fig. 1, where a dotted outline only, represents its position on the smoke-hood when made use of.

Figure 3:
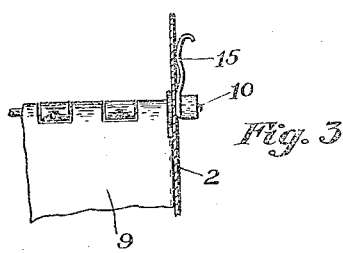
Fig. 3 is a fragmentary sectional view through the smoke-hood, showing the partition and the damper.
Figure 4:
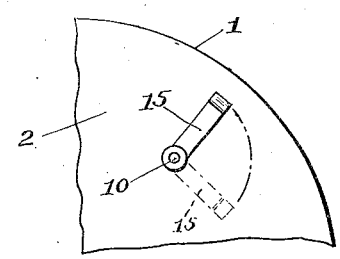
Fig. 4 is a side view of the damper-holding means.

In Figs. 3 and 4 I illustrate a simple method of holding the damper frictionally fixed in any desired position. Secured to the hinge rod, at 10, is a spring handle 15 which has sufficient set against the side of the smoke-hood side wall to overcome the weight of the damper and hold it in any position it is desired to be placed.

In operation, the rear stove cover fitting the stove hole 4 is removed and the smoke-hood placed on the stove top, with the draft passage at the rear of the smoke-hood superimposed on this hole. The damper is closed.

The cooking vessel with the food therein is placed over the hole 3, after first removing the cover, and immediately the food is heated sufficiently to emit fumes the damper is regulated so as to take care of all gas or odors but only in exceptional cases must it be full open.

By the proper adjustment of the damper much heat may be retained in the cooking chamber and utilized for cooking purposes.

My smoke-hood may be made as an integral structure,—as for instance a steel stamping,—or it may be fabricated from individual elements and secured together in any approved manner. The partition in any event will be either welded or riveted to the side walls. While I have illustrated the damper as oscillating from one of its lateral edges, it is obvious that it might be so constructed that it would pivot at each end and swing from an axis centrally of its width.

Having thus described my invention, what I claim is:—

1. A smoke-hood for cook stoves, comprising two side walls, a top, covering the space interjacent said side walls and declining rearwardly in a curved form to the base line of said smoke-hood, closing one end thereof and leaving on the opposite end a relatively large opening out of said space, a door adapted to close said large opening, a partition joining said side walls within and intermediate the ends of said smoke-hood and extending from the base line of said smoke-hood upwardly to within a spaced distance of the said top and means whereby the air passage interconnecting the two compartments formed by the said partition may be restricted in varied and predetermined amounts relative to the effective size of the opening therethrough.

2. A smoke-hood for cook stoves, comprising two side walls, a top, adapted to cover the space embraced by said side walls, said top to decline rearwardly in a long curved shape to the base line of said smoke-hood and terminating at the front end in a relatively short curve a spaced distance from the said base line, the convex sides of said curves being outwardly disposed, a partition joining said side walls and extending from the said base line upwardly to within a spaced distance from the said top, forming within said smoke-hood two interconnecting compartments, a damper operable adjacent the intercommunicating passage between the said two compartments and means to actuate said damper.

3. In a smoke-hood for cook stoves, comprising, in combination with a stove having a front and rear hole in the top thereof, two lateral members converging toward the rearward end of said smoke-hood and adapted to embrace space superjacent both of the said two stove holes, a top member covering the space embraced by the said two lateral members and adapted to close the rearward end of said smoke-hood while leaving a relatively large opening in the front end thereof, the front portion of said top member to be curved in shape with the convex side outwardly disposed, a partition joining said lateral members and adapted to divide said smoke-hood into two compartments with a relatively small interconnecting passage therebetween, said partition to be so located as to be interjacent the said two stove holes when said smoke-hood is in position on the top of said stove, a damper operably positioned adjacent said interconnecting passage and means to hold said damper fixed in various positions relative to said passage.

4. A smoke-hood for cook stoves, comprising two sides converging rearwardly, a top, covering the space embraced by said sides and forming in longitudinal vertical section substantially an involute curve, the starting point in the generation of the said curve being located at the forward end of the smoke-hood, said top to close the rear end while leaving a relatively large opening in the front end of said smoke-hood, a partition extending transversely of said smoke-hood and joined to the said sides and rising from the base line thereof to within a spaced distance of the said top, leaving a relatively small intercommunicating passage between the two compartments of said smoke-hood, a damper adapted to restrict at various times and in various degrees the effective size of the opening between the said two compartments and a handle on said hood for the purpose of manipulating the same.

5. In a device of the character described, comprising a top of substantially involute contour in longitudinal elevation and the concave surface of which to be inwardly disposed, two sides, said top and said sides joined together forming a closure having one open and one closed end, a door adapted to close said open end, a vertical partition located within and transversely of said closure and dividing the latter into two compartments,—one in the front and one in the rear end of said smoke-hood, said partition being shortened in height so as to provide a relatively small space above its upper edge whereby intercommunication between the said two compartments may be had and means whereby the interior of said forward compartment may be completely closed against outside communication.

NORMAN U. GREENLAW.